(12) United States Patent
Scott et al.

(10) Patent No.: US 7,372,865 B2
(45) Date of Patent: May 13, 2008

(54) PROCESSING DATA PACKETS USING TIME STAMPED MARKER PACKETS

(75) Inventors: Kyl W. Scott, Richardson, TX (US); Saikat Ray, Boston, MA (US); Xunxiang Zhou, Allen, TX (US)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 10/616,130

(22) Filed: Jul. 9, 2003

(65) Prior Publication Data

US 2005/0007961 A1 Jan. 13, 2005

(51) Int. Cl.
*H04L 12/54* (2006.01)

(52) U.S. Cl. ............... 370/429; 370/394; 370/412; 370/419; 709/217; 709/224

(58) Field of Classification Search ............. 370/395, 370/429
See application file for complete search history.

(56) References Cited

U.S. PATENT DOCUMENTS

| | | | | |
|---|---|---|---|---|
| 5,339,311 A | * | 8/1994 | Turner | 370/394 |
| 6,055,246 A | | 4/2000 | Jones | 370/503 |
| 6,247,058 B1 | * | 6/2001 | Miller et al. | 709/234 |
| 6,441,980 B1 | | 8/2002 | Baron et al. | 360/48 |
| 6,907,041 B1 | * | 6/2005 | Turner et al. | 370/412 |
| 2002/0021717 A1 | | 2/2002 | Hedayat et al. | 370/508 |
| 2002/0089508 A1 | | 7/2002 | Sowizral et al. | 345/522 |
| 2002/0194343 A1 | | 12/2002 | Shenoi et al. | 709/227 |
| 2003/0140116 A1 | * | 7/2003 | Levi et al. | 709/217 |

FOREIGN PATENT DOCUMENTS

GB 2 342 527 A 4/2000

OTHER PUBLICATIONS

European Search Report; Application No./Pat. No. 04016110.1-2416; Reference: 104 304 a/km; Applicant: Fujitsu Limited, Apr. 7, 2006.

* cited by examiner

*Primary Examiner*—Huy D. Vu
*Assistant Examiner*—Salvador E. Rivas
(74) *Attorney, Agent, or Firm*—Baker Botts L.L.P.

(57) ABSTRACT

According to one embodiment, processing data packets includes inserting marker packets into a data stream at time intervals. Each marker packet includes a respective first time stamp indicative of the time the marker packet is inserted. An estimate of the age of a data packet is calculated based on a current time system and the respective first time stamp of the last marker packet that was inserted into the data stream before the data packet.

29 Claims, 2 Drawing Sheets

PROCESSING DATA PACKETS USING TIME STAMPED MARKER PACKETS

TECHNICAL FIELD OF THE INVENTION

This invention relates generally to the field of data communications and more specifically to processing data packets using markers.

BACKGROUND OF THE INVENTION

Processing data packets at a node generally requires monitoring the age of the data packets. Monitoring of data packets is necessary to prevent aged data packets from occupying queue space and to prevent stale data from being received by unintended users. Known techniques for monitoring the age of data packets involve time stamping the data packets. Traditional time stamping, however, may result in aliasing or rollover because, due to the small number of bits used for time stamping, the stored time may be interpreted as representing a different time than the age of the packet. Increasing the number of bits used for data packet time stamping may alleviate rollover, but may increase the bandwidth needed.

SUMMARY OF THE INVENTION

According to one embodiment, processing data packets includes inserting marker packets into a data stream at time intervals. Each marker packet includes a respective first time stamp indicative of the time the marker packet is inserted. An estimate of the age of a data packet is calculated based on a current time system and the respective first time stamp of the last marker packet that was inserted into the data stream before the data packet.

Certain embodiments of the invention may provide one or more technical advantages. A technical advantage of one embodiment may be that by using a long time stamp at a marker packet, rollover of data packets may be avoided. Another technical advantage of one embodiment may be that inserting marker packets into a data stream may provide for reliable monitoring of data packet age while maintaining the effective increase in bandwidth to a minimum.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
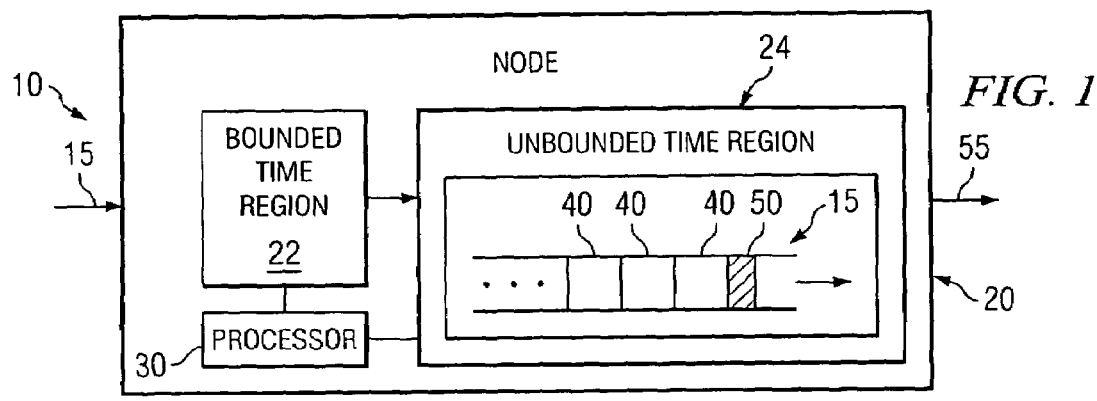
FIG. 1 is a block diagram of one embodiment of a system that may be used in accordance with the present invention.

FIG. 1 is a block diagram of one embodiment of a system 10 that may be used in accordance with the present invention. In general, a marker packet 50 is inserted in a data stream 15, and the ages of data packets 40 entering a node 20 are monitored.

Node 20 includes, in this example, a bounded time region 22, an unbounded region 24, and a processor 30 coupled as shown in FIG. 1. Processor 30 generates marker packets 50 used to calculate the age of each data packet in data stream 15. As used in this document, "each" refers to each member of a set or each member of subset of a set. In operation, node 20 receives a data stream 15 comprising data packets 40. Upon entering node 20, each data packet 40 is time stamped. Processor 30 generates a marker packet 50 that include a marker time stamp and inserts a marker packet 50 in data stream 15 as data stream 15 enters an unbounded time region 24. Processor 30 monitors the age of each data packet using the marker time stamps, as described in greater detail below.

Bounded time region 22 receives data stream 15 and forwards the data stream 15 to unbounded time region 24. According to the illustrated embodiment, data packets 40 spend a fixed amount of time within bounded time region 22 that is often substantially smaller than a maximum allowed time $T_A$ that a data packet 40 is allowed to live at node 20.

Unbounded time region 24 receives data packets 40 from data stream 15. According to one embodiment, unbounded time region 24 includes deep data storage such as a First-in-First-Out (FIFO) queue (not explicitly shown); however, any other suitable data storage region may be used without departing from the scope of the invention.

Processor 30 generates short time stamps and long time stamps. Short time stamps are inserted into data packets 40 and long time stamps are inserted into marker packets 50. Processor 30 generates an n bit short time stamp for each data packet. The short time stamp includes a snap shot of the n least significant bits of a system clock. For example, the short time stamp may comprise 4 bits, 8 bits, 12 bits, or any other number of bits suitable for conveying a short time stamp packet. According to the illustrated embodiment, the data packet time stamp comprises 4 bits. According to one embodiment, the number of bits sufficient to present a usable short time stamp may be calculated according to Equation (1):

$$n = \left\lceil \log_2\left(\frac{2 * T_A}{Res}\right) \right\rceil \quad (1)$$

where $T_A$ represents the maximum allowed time corresponding to the time that a data packet is allowed to remain at node 20, and Res represents a system resolution defined as the period of time at which a counter increments. For example, a short time stamp bit size may be chosen such that it can contain at least twice the maximum allowed time $T_A$ using a predetermined resolution Res such as a one quarter of a second. According to one embodiment, a short time stamp of 4 bits results from Equation (1) by using a maximum allowed time $T_A$ of two seconds and a resolution Res of 250 milliseconds. Any other suitable maximum allowed time $T_A$ and resolution Res values may be used without departing from the scope of the invention.

Processor 30 also generates long time stamps having sufficient number of bits to reflect the time at which the marker packet was created and inserted in data stream 15. In one example, each marker packet 50 comprises a long time stamp carrying a forty bit time stamp that reflects the current system time corresponding to the time at which marker packet 50 was created and inserted in data stream 15. According to the illustrated embodiment, any sufficiently large number of bits suitable for rollover avoidance may be used without departing from the scope of the invention. For example, the long time stamp may comprise more than forty bits or less than forty bits without departing from the scope of the invention.

Processor 30 inserts marker packets 50 in data stream 15 at time intervals. Processor 30 determines the time intervals sufficient to ensure that marker packets 50 inserted may be detected at least once per cycle. A cycle in data stream 15 may be defined as the maximum time that a data packet 40 is expected to remain at node 20, not to exceed the maximum allowed time $T_A$. Processor 30 may insert at least one marker packet 50 per cycle. For example, processor 30 may insert one marker packet 50 at least every two seconds if the maximum allowed time $T_A$ is two seconds. Cycles may be shorter, however, without departing from the scope of the invention. Marker packet insertion is more particularly described with reference to FIGS. 2A and 2B.

When marker packets 50 are inserted in data stream 15, unbounded time region 24 may receive data stream 15 to process data packets 40 comprised therein according to their priority. For example, unbounded time region 24 may comprise a FIFO queue that handles packets in priority of entry. Another embodiment of a FIFO queue that may be used is a restrictive reordering FIFO, which will be more particularly described with reference to FIG. 3. Processor 30 may be coupled to unbounded time region 24 to detect marker packets 50, to store the time stamp of marker packet 50 detected, and to calculate the age of data packets 40 at egress of unbounded time region 24.

Processor 30 detects marker packets 50 inserted in data stream 15 as data stream 15 exits unbounded time region 24. According to the illustrated embodiment, processor 30 detects marker packets 50 using a marker packet header that includes marker packet identification bits. Any other suitable technique for detecting marker packets 50 may be performed by processor 30 without departing from the scope of the invention.

Processor 30 may instruct unbounded time region 24 to store the time stamp of the detected marker packet 50. The marker packet time stamp may be stored at a data storage of unbounded time region 24, a memory region of node 20, or any other suitable data storage at node 20.

Processor 30 calculates the age of each data packet 40 of data stream 15 using the stored marker packet time stamp of the marker packet 50 that most recently exited unbounded time region 24, the data packet time stamp, and a current system time. According to the illustrated embodiment, processor 30 calculates the age of each data packet 40 by determining the length of time marker packet 50 has spent at node 20 and the length of time the data packet 40 has been at node 20 relative to the marker time stamp of the previously detected marker packet 50. Using these determinations, processor 30 effectively calculates how long a data packet 40 has been at node 20.

By determining the age of each data packet 40, as each data packet 40 egresses unbounded time region 24, processor 30 may determine whether data packet 40 should be discarded. Processor 30 compares the calculated age of each data packet 40 to maximum allowed time $T_A$ to determine if data packet 40 should be allowed at output data stream 55 or if the data packet 40 should be discarded. For example, if the age of data packet 40 is lower than the maximum allowed time $T_A$, processor 30 determines that data packet 40 may be allowed at output data stream 55. As another example, if the calculated age is equal to or exceeds the maximum allowed time $T_A$, processor 30 determines that data packet 40 may be discarded. Discarded data packets 40 are not forwarded to output data stream 55. According to one embodiment, the discarded data packets 40 may be stored anywhere at node 20 without departing from the scope of the invention.

According to another embodiment, processor 30 may insert marker packets 50 in an asynchronous manner. For example, a queue at unbounded time region 24 may be congested so that generated marker packets 50 may not be inserted in data stream 15. Processor 30 may drop incoming data packets 40 until the congestion status improves. If the congestion status improves, such as when the queue has capacity to insert marker packets 50, processor 30 may first insert a marker packet 50 with the current system time before inserting new data packets 40 into the stream 15. Any other suitable technique may be used to handle congestion at unbounded time region 24. For example, processor 30 may overwrite a previously received marker packet 50 with a new marker packet 50 during the congestion period in addition to discarding data packets 40 until the congestion status improves.

Modifications, additions, or omissions may be made to system 10 without departing from the scope of the invention. For example, bounded time region 22 may be omitted. As another example, more than one unbounded time region 24 may be used at node 20 to receive any number of data stream 15 and output any number of output data streams 55. As yet another example, processor 30 may be coupled to bounded time region 22, unbounded time region 24, and any other module, memory, and application layer that may be included at node 20. Additionally, functions may be performed using suitable logic comprising software, hardware, other logic, or any other suitable combination of the preceding.

Diagrams of embodiments of data stream 15 incorporating marker packets 50 in accordance with the present invention are described with reference to FIGS. 2A and 2B. A diagram of an embodiment of a First-in-First-Out (FIFO) queue and a corresponding data stream 15 that may be used in accordance with the present invention are described with reference to FIG. 3. A flowchart demonstrating one embodiment of a method for using processing data packets 40 that may be used in accordance with the present invention is described with reference to FIG. 4.

Figure 2A:
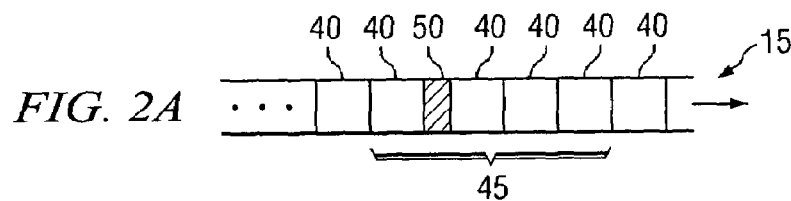
FIGS. 2A-2B are diagrams of embodiments of data streams incorporating marker packets in accordance with the present invention.
Figure 2B:
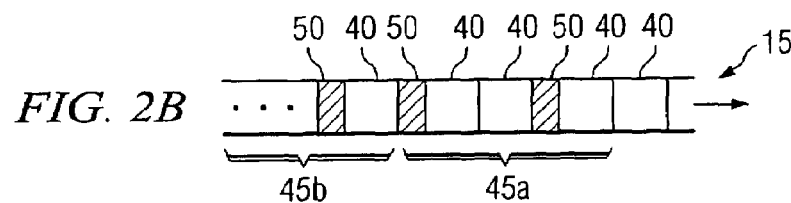

FIGS. 2A and 2B are embodiments of data streams 15 into which marker packets 50 are inserted in accordance with the present invention. Processor 30 determines the time interval at which to insert marker packets 50 in data stream 15. Variations of data stream 15 including any suitable number of marker packets 50 may be used without departing from the scope of the invention.

FIG. 2A is a diagram of an embodiment of data stream 15 illustrating at least one marker packet 50 per cycle 45. As described with reference to FIG. 1, processor 30 may insert marker packets 50 at least once per cycle 45. According to the illustrated embodiment, cycle 45 includes four data packets 40 and one marker packet 50.

Cycle 45 may be modified to include more or fewer data packets 40 and more marker packets 50. For example, cycle 45 may be modified to include fewer data packets 40 and more marker packets 50 without departing from the scope of the invention.

FIG. 2B illustrates an embodiment of data stream 15 comprising cycles 45a and 45b, marker packets 50a, 50b and 50c, and data packets 40. As described with reference to FIG. 1, processor 30 may insert multiple marker packets 50 in data stream 15. According to the illustrated embodiment, processor 30 inserts two packets per cycle 45, for example, marker packets 50a and 50b are inserted at cycle 45a of data stream 15. Cycle 45 may comprise the maximum allowed time $T_A$. For example, if the maximum time allowed $T_A$ is two seconds, at least one marker packet 50 may be inserted every two seconds. According to another embodiment, the time interval of cycle 45 may be lower than the maximum allowed time. Any suitable time interval may be used by processor 30 without departing from the scope of the invention.

As was described with reference to FIG. 2A, data stream 15 of FIG. 2B may be modified to increase the number of data packets 40 per cycle 45, increase the number of marker packets 50 at cycle 45, and alter the length of cycle 45 depending on the design and application. In one example, cycle 45 may be adjusted to account for a synchronization error $T_{sync}$. Synchronization error $T_{sync}$ defines the time difference between the time stamp values processor 30 uses to calculate the age of the data packets 40. System 10 may be designed such that synchronization error $T_{sync}$ is accounted for as described by Equation (2):

$$T_{in}-T_{stamp}<\Gamma_R/2-T_{sync} \qquad (2)$$

where $T_{in}$ describes the ingress time of data packet 40 at unbounded time region 24, $T_{stamp}$ represents the data packet time stamp, and $\Gamma_R$ is a rollover time of the short time stamp. Using Equation (2), the maximum time allowed $T_A$ used to determine cycle 45 may be adjusted as described by Equation (3):

$$T_A=\Gamma_R/2-T_{sync} \qquad (3)$$

Cycles 45a and 45b may be substantially similar. Cycles 45a and 45b may, however, vary in length from each other. For example, cycle 45a may be a specific length, while cycle 45b may be another length.

Figure 3:
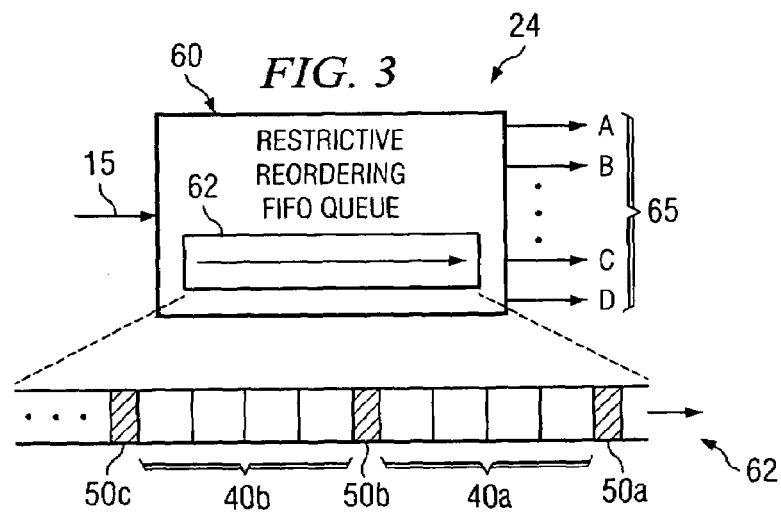
FIG. 3 is a diagram of an embodiment of a First-In-First-Out (FIFO) queue and a corresponding data stream that may be used in accordance with the present invention.

FIG. 3 is a diagram of an embodiment of an unbounded time region 24 comprising a restrictive reordering FIFO queue 60 and a corresponding data stream 62 that may be used in accordance with the present invention. A restrictive reordering FIFO queue 60 is shown including data stream 15 and output threads 65. According to one embodiment, unbounded time region 24 may comprise a restrictive reordering FIFO queue 60 where data packets 40 may be reordered making the egress ordering of data packets 40 different from the ingress ordering of data packets 40. According to the illustrated embodiment, data stream 65 includes inserted marker packets 50a, 50b, and 50c, and data packet sets 40a and 40b comprising one or more data packets.

Restrictive reordering FIFO queue 60 generally operates substantially similar to a basic FIFO queue. Packets from threads 65 of queue 60, however, may be processed in a different order. For example, data packet set 40a from a thread A may be processed, after which a data packet set 40a from a thread B may be processed in sequence. The unprocessed data packet sets and the corresponding data packets 40 remain in the order they entered the queue. That is, for example, data packets 40 and data packet set 40b are not reordered.

According to one embodiment, each thread of data threads 65 may comprise an embodiment of data stream 62. For example, the illustrated data stream 62 may be forwarded to thread A of data threads 65, while another data stream 62 (not shown) may be forwarded to thread B. Any other suitable arrangement of data streams 62 at data threads 65 may be used without departing from the scope of the invention. Additionally, the reordering may be accomplished according to any suitable criteria, such as priority, as long as the data packets and data packet sets are maintained at the same FIFO order.

According to the illustrated embodiment, marker packet 50a is used to calculate the age of data packets 40 of data packet set 40a, while marker packet 50b is used to calculate the age of the data packets of data packet set 40b. Any number of data packets 40 may be part of a data packet set and any number of data packet sets may be included in modified data stream 62 without departing from the scope of the invention. Additionally, restrictive reordering FIFO queue 60 may include any suitable number of data threads 65 without departing from the scope of the invention.

Modifications, additions, or omissions may be made to restrictive reordering FIFO queue 60 without departing from the scope of the invention. For example, modified data stream 62 may be generated using any number of data packets 40, any number of marker packets 50 and according to any length of cycle 45. As another example, restrictive reordering FIFO queue 60 may use any suitable criteria to reorder data packet sets such as priority. Additionally, functions may be performed using any suitable logic comprising software, hardware, other logic, or any suitable combination of the preceding.

Figure 4:
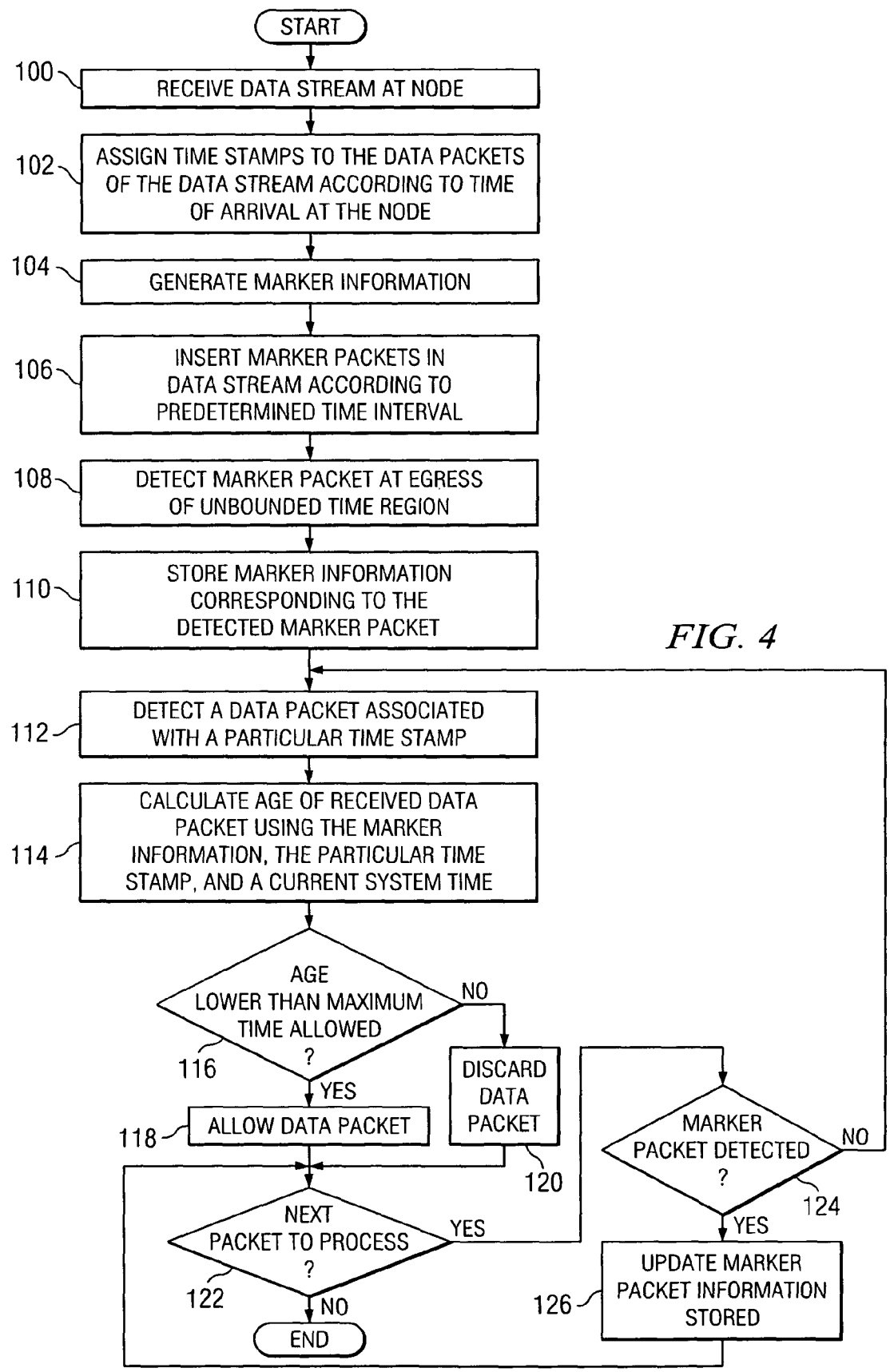
FIG. 4 is a flowchart demonstrating one embodiment of a method for use in processing data packets that may be used in accordance with the present invention.

FIG. 4 is a flowchart demonstrating one embodiment of a method for use in processing data packets 40 that may be used in accordance with the present invention. In general, a data stream 15 comprising data packets 40 is received at node 20. Data packets 40 are time stamped to indicate a time at which the data packets 40 enter node 20. Processor 30 inserts marker packets 50 in data stream 15, where marker packets 50 comprise a marker time stamp indicating a time at which a marker packet 50 enters unbounded time region 24. Data stream 15 is processed to determine the age of data packets 40 using the marker time stamp, the data packet time stamp and the current system time. The calculated age of data packets 40 is used to determine if data packets 40 should be discarded or allowed to be routed to an output data stream 55. By inserting long time stamps as marker packets 50 in data stream 15, rollover may be avoided while maintaining an effective bandwidth.

The method begins at step 100 where a node receives a data stream 15. The method proceeds to step 102 where processor 30 assigns time stamps to data packets 40 of data stream 15 according to a time of arrival. The time stamp assigned to each data packet 40 may comprise a short time stamp indicative of a time at which a data packet 40 enters a region. According to one embodiment, the time stamp may indicate the time at which data packet 40 enters the node, bounded time region 22, unbounded time region 24, or some, none, or all of the preceding. As was described with reference to FIG. 1, the short time stamp assigned to data packet 40 may comprise any suitable number of bits without departing from the scope of the invention.

At step 104, processor 30 generates marker information. The marker information comprises a long time stamp indicating the time at which marker packet 50 enters a region. According to the illustrated embodiment, the marker time stamp indicates the time at which marker packet 50 is inserted at node 20, bounded region 22, unbounded time region 24, or some, none, or all of the preceding. As described with reference to FIG. 1, the long time stamp of marker packet 50 carries a larger number of bits than the short time stamp. For example, the long time stamp may comprise forty bits, while the short time stamp may comprise four bits. According to one embodiment, marker packet 50 comprises a twenty-four byte packet that includes a header, error correction information, end of packet information, and a 40 bit time stamp. Any other suitable number of bits may be included at marker packet 50 without departing from the scope of the invention.

The method proceeds to step 106, where processor 30 inserts the generated marker packets 50 in data stream 15 according to a time interval. According to the illustrated embodiment, the time interval comprises a time period substantially equal to the maximum allowed time, $T_A$. The time interval, however, may be lower than the maximum allowed time $T_A$ to increase the number of marker packets that may be included per cycle 45 of data stream 15, as was more particularly described with reference to FIGS. 2A and 2B.

At step 108, processor 30 detects marker packet 50 at egress of unbounded time region 24. The method then proceeds to step 110 where the marker information corresponding to the detected marker packet 50 is stored.

At step 112, processor 30 detects a data packet 40 associated with a particular time stamp. For example, after detecting marker packet 50, processor 30 may detect subsequent data packets 40 each associated with a particular time stamp. Processor 30 calculates the age of the received data packet 40 using the marker information and the current system time at step 114. According to the illustrated embodiment, the data packet age is calculated by first performing a N-bit subtraction, such as a 40 bit subtraction. The N-bit subtraction of the current system time $T_c$ minus the marker time stamp value $T_m$ may yield the time indicating how long marker packet 50 has been at node 20. According to one embodiment, the N-bit subtraction described by Equation (4) below may effectively yield an estimate of the age of data packet 40.

According to another embodiment, processor 30 determines the age of data packet 40 relative to the last detected marker packet 50 by performing an n-bit subtraction of the marker packet time stamp value $T_m$ minus the data packet time stamp $T_{stamp}$. The result of the n-bit subtraction is sign extended to N bits to determine the total time the frame or data packet 40 has been at node 20 according to Equation (4):

$$T_c - T_m \big|_{N-bitsubtraction} + T_m - T_{stamp} \big|_{n-bitsubtraction} < T_A \quad (4)$$

The method then proceeds to step 116, where processor 30 determines if the calculated age is lower than the maximum allowed time $T_A$. From Equation (4), processor 30 determines if the calculated age is lower than the maximum allowed time $T_A$. If the calculated age is lower than the maximum allowed time $T_A$, processor 30 allows the data packet 40 at step 118, and forwards the data packet 40 to an output data stream 55.

If the calculated age is not lower than the maximum allowed time $T_A$ at step 116, processor 30 instructs unbounded time region 24 to discard data packet 40 at step 120. Data packet 40 may be discarded when the age calculated at step 114 is equal to or exceeds the maximum time allowed $T_A$. For example, for a maximum allowed time $T_A$ of two seconds, if the age calculated is equal to or is greater than two seconds, processor 30 instructs unbounded time region 24 to discard data packet 40.

At step 122 the method proceeds to determine if there is a next packet that needs to be processed. If there are subsequent packets to process at step 122, the method proceeds to step 124, where processor 30 determines if the next packet to be processed is a marker packet 50. If a next marker packet 50 is detected at step 124, the method proceeds to step 126 where the marker information stored at step 110 is updated with the marker information corresponding to the next marker packet 50 detected. If the next packet to process is not a marker packet 50 at step 124, the method returns to step 112, where processor 30 detects a next data packet 40. If there are no next packets to process at step 122, the method terminates.

Steps may be added, omitted, modified, or performed in any suitable order without departing from the scope of the invention. For example, generating marker information at ingress of unbounded time region 24 at step 104 may be performed simultaneously with inserting marker packets 50 in data stream 15 according to a time interval at step 106. As another example, storing marker information corresponding to the detected marker packet 50 at step 110 may be omitted. As yet another example, a step may be added to determine if there is congestion at unbounded time region 24 so that processor 30 may prevent data packets 40 from entering the queue as was described with reference to FIG. 1. Additionally, functions may be performed using any suitable logic comprising software, hardware, other logic, or any suitable combination of the preceding.

Certain embodiments of the invention may provide one or more technical advantages. A technical advantage of one embodiment may be that by using a long time stamp at a marker packet, rollover of data packets may be avoided. Another technical advantage of one embodiment may be that inserting marker packets into a data stream may provide for reliable monitoring of data packet age while maintaining the effective increase in bandwidth to a minimum.

Although an embodiment of the invention and its advantages are described in detail, a person skilled in the art could make various alterations, additions, and omissions without departing from the spirit and scope of the present invention as defined by the appended claims.

what is claimed is:

1. A method for use in processing data packets, comprising:

marking a plurality of data packets in a data stream with a respective first time stamp indicative of a time at which the data packet enters a region selected from a group consisting of the node, a bounded region of the node, and an unbounded region of the node, the first time stamp comprising a first number of bits;

inserting a plurality of marker packets into the data stream at time intervals, each marker packet comprising a respective second time stamp indicative of the time at which the marker packet enters a region selected from a group consisting of the node, a bounded region of the node, and an unbounded region of the node, the second time stamp comprising a second number of bits, the second number of bits being greater than the first number of bits, the time intervals comprising time periods selected from a group consisting of substantially equal to a maximum allowed time and lower than the maximum allowed time, the marker packet further comprising a plurality of error correction bits;

calculating for at least one data packet an estimation of an age of the data packet based on a current system time, the respective first time stamp, and the respective second time stamp of the last marker packet that was inserted into the data stream before the data packet, the calculation of the age of the data packet obtained by the following equation:

$$T_c - T_m|_{N\text{-bit subtraction}} + T_m - T_{stamp}|_{n\text{-bit subtraction}}$$

where $T_c$ is the current system time, $T_m$ is the respective second time stamp, $T_{stamp}$ is the respective first time stamp, N corresponds to the second number of bits, and n corresponds to the first number of bits;
   discarding the data packet if the calculated age is equal to or exceeds a maximum allowed time; and
   allowing the data packet if the calculated age is lower than a maximum allowed time.

2. A method for use in processing data packets, comprising:
   inserting a plurality of marker packets into a data stream at time intervals, each marker packet comprising a respective first time stamp indicative of the time the marker packet is inserted;
   calculating for at least one data packet an estimate of an age of the data packet based on a current system time and the respective first time stamp of the last marker packet that was inserted into the data stream before the data packet; and
   marking a plurality of data packets in the data stream with a respective second time stamp indicative of a time at which the data packet enters a node; each first time stamp having a first number of bits and each second time stamp having a second number of bits, the first number being greater than the second number;
wherein calculating for at least one data packet the estimate of the age of the data packet further comprises calculating the estimate of the age of the data packet based on the current system time, the respective first time stamp, and the respective second time stamp.

3. The method of claim 2, further comprising discarding the data packet if the calculated estimate of the age is equal to or exceeds a maximum allowed time.

4. The method of claim 2, further comprising allowing the data packet if the calculated estimate of the age is lower than a maximum allowed time.

5. The method of claim 2, wherein the respective second time stamp indicative of a time at which the data packet enters the node is the time at which the data packet enters a region selected from a group consisting of the node, a bounded region of the node, and an unbounded region of the node.

6. The method of claim 2, wherein the respective first time stamp indicative of the time the marker packet is inserted is the time at which the marker packet enters a region selected from a group consisting of the node, a bounded region of the node, and an unbounded region of the node.

7. The method of claim 2, wherein calculating the estimate of the age of the data packet further comprises:
   calculating a first difference between the current system time and the respective first time stamp;
   calculating a second difference between the respective first time stamp and the respective second time stamp; and
   adding the first difference and the second difference.

8. The method of claim 2, wherein the time interval comprises an interval of time substantially equal to a maximum allowed time.

9. The method of claim 2, wherein the time interval comprises an interval of time less than a maximum allowed time.

10. The method of claim 2, wherein the marker packet further comprises a plurality of error correction bits.

11. A system for processing data packets, comprising:
a node operable to receive a data stream; and
a processor associated with the node and operable to:
   insert a plurality of marker packets into the data stream at time intervals, each marker packet comprising a respective first time stamp indicative of the time the marker packet is inserted;
   calculate for at least one data packet an estimate of an age of the data packet based on a current system time and the respective first time stamp of the last marker packet that was inserted into the data stream before the data packet;
   mark a plurality of data packets in a data stream with a respective second time stamp indicative of a time at which the data packet enters a node; each first time stamp having a first number of bits and each second time stamp having a second number of bits, the first number being greater than the second number; and
   calculate the estimate of the age of the data packet based on the current system time, the respective first time stamp, and the respective second time stamp.

12. The system of claim 11, the processor further operable to discard the data packet if the calculated estimate of the age is equal to or exceeds a maximum allowed time.

13. The system of claim 11, the processor further operable to allow the data packet if the calculated estimate of the age is lower than a maximum allowed time.

14. The system of claim 11, wherein the respective second time stamp indicative of a time at which the data packet enters the node is the time at which the data packet enters a region selected from a group consisting of the node, a bounded region of the node, and an unbounded region of the node.

15. The system of claim 11, wherein the respective first time stamp indicative of the time the marker packet is inserted is the time at which the marker packet enters a region selected from a group consisting of the node, a bounded region of the node, and an unbounded region of the node.

16. The system of claim 11, wherein the processor is further operable to calculate the estimate of the age of the data packet by:
   calculating a first difference between the current system time and the respective first time stamp;
   calculating a second difference between the respective first time stamp and the respective second time stamp; and
   adding the first difference and the second difference.

17. The system of claim 11, wherein the time interval comprises an interval of time substantially equal to a maximum allowed time.

18. The system of claim 11, wherein the time interval comprises an interval of time less than a maximum allowed time.

19. The system of claim 11, wherein the marker packet further comprises a plurality of error correction bits.

20. A logic for processing data packets, the logic embodied in a medium and operable to:
   insert a plurality of marker packets into a data stream at time intervals, each marker packet comprising a respective first time stamp indicative of the time the marker packet is inserted;
   calculate for at least one data packet an estimate of an age of the data packet based on a current system time and the respective first time stamp of the last marker packet that was inserted into the data stream before the data packet;
   mark a plurality of data packets in a data stream with a respective second time stamp indicative of a time at which the data packet enters a node; each first time stamp having a first number of bits and each second time stamp having a second number of bits, the first number being greater than the second number; and calculate the estimate of the age of the data packet based on the current system time, the respective time stamp, and the respective second time stamp.

21. The logic of claim 20, the logic further operable to discard the data packet if the calculated estimate of the age is equal to or exceeds a maximum allowed time.

22. The logic of claim 20, the logic further operable to allow the data packet if the calculated estimate of the age is lower than a maximum allowed time.

23. The logic of claim 20, wherein the respective second time stamp indicative of a time at which the data packet enters the node is the time at which the data packet enters a region selected from a group consisting of the node, a bounded region of the node, and an unbounded region of the node.

24. The logic of claim 20, wherein the respective first time stamp indicative of the time the marker packet is inserted is the time at which the marker packet enters a region selected from a group consisting of the node, a bounded region of the node, and an unbounded region of the node.

25. The logic of claim 20, the logic further operable to calculate the estimate of the age of the data packet by:
   calculating a first difference between the current system time and the respective first time stamp;
   calculating a second difference between the respective first time stamp and the respective second time stamp; and
   adding the first difference and the second difference.

26. The logic of claim 20, wherein the time interval comprises an interval of time substantially equal to a maximum allowed time.

27. The logic of claim 20, wherein the time interval comprises an interval of time less than a maximum allowed time.

28. The logic of claim 20, wherein the marker packet further comprises a plurality of error correction bits.

29. A system for use in processing data packets, comprising:
   means for inserting a plurality of marker packets into the data stream at time intervals, each marker packet comprising a respective first time stamp indicative of the time the marker packet is inserted; and
   means for calculating for at least one data packet an estimate of an age of the data packet based on a current system time and the respective first time stamp of the last marker packet that was inserted into the data stream before the data packet; and
   means for marking a plurality of data packets in the data stream with a respective second time stamp indicative of a time at which the data packet enters a node, each first time stamp having a first number of bits and each second time stamp having a second number of bits, the first number being greater than the second number, wherein calculating for at least one data packet the estimate of the age of the data packet further comprises calculating the estimate of the age of the data packet based on the current system time, the respective first time stamp, and the respective second time stamp.

* * * * *